US011636667B2

(12) United States Patent
Masuko (10) Patent No.: US 11,636,667 B2
(45) Date of Patent: Apr. 25, 2023

(54) PATTERN RECOGNITION APPARATUS, PATTERN RECOGNITION METHOD, AND COMPUTER PROGRAM PRODUCT

(71) Applicant: Kabushiki Kaisha Toshiba, Tokyo (JP)

(72) Inventor: Takashi Masuko, Kawasaki Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1476 days.

(21) Appl. No.: 15/677,069

(22) Filed: Aug. 15, 2017

(65) Prior Publication Data

US 2018/0137410 A1    May 17, 2018

(30) Foreign Application Priority Data

Nov. 16, 2016   (JP) .............................. JP2016-223333

(51) Int. Cl.
*G06N 3/044* (2023.01)
*G06V 10/82* (2022.01)
(Continued)

(52) U.S. Cl.
CPC .............. *G06V 10/82* (2022.01); *G06F 17/16* (2013.01); *G06F 18/241* (2023.01); *G06N 3/044* (2023.01); *G06F 2218/12* (2023.01)

(58) Field of Classification Search
CPC ......... G06N 3/04; G06N 3/0445; G06F 17/16
See application file for complete search history.

(56) References Cited

U.S. PATENT DOCUMENTS 8,099,181 B2   1/2012  Sterzing et al.
8,566,264 B2  10/2013  Schäfer et al.
(Continued)

FOREIGN PATENT DOCUMENTS

JP    2002-541599    12/2002
JP    2004-272243     9/2004
(Continued)

OTHER PUBLICATIONS

Yokoyama et al., "Sequencial activity recognition by dimension reduction with deep learning," The 29th Annual Conference of the Japanese Society for Artificial Intelligence (2015), pp. 1-2, with English-language machine translation.
(Continued)

*Primary Examiner* — Luis A Sitiriche
(74) *Attorney, Agent, or Firm* — Finnegan, Henderson, Farabow, Garrett & Dunner, LLP (57) ABSTRACT

According to an embodiment, a pattern recognition apparatus includes an RNN layer, as a middle layer, that includes an input converting unit and an RNN processor. The input converting unit performs conversion, for each step, on an input vector and a recurrent input vector, and calculates and outputs a converted vector of which the number of dimensions is smaller than the sum of the numbers of dimensions of respective the input vector and the recurrent input vector. The input vector is formed of a feature vector output from an input layer or an output of the RNN processor included in a lower RNN layer. The recurrent input vector is formed of an output of a previous step of the RNN processor. The RNN processor calculates an RNN output vector from the converted vector calculated in the input converting unit and outputs the RNN output vector, for each step.

16 Claims, 5 Drawing Sheets

(51) Int. Cl.
*G06F 17/16* (2006.01)
*G06F 18/241* (2023.01)

(56) References Cited

U.S. PATENT DOCUMENTS

| | | |
|---|---|---|
| 2004/0167778 A1 | 8/2004 | Valsan et al. |
| 2013/0013543 A1 | 1/2013 | Düll et al. |
| 2015/0161991 A1 | 6/2015 | Sak et al. |
| 2016/0098844 A1 | 4/2016 | Shaji et al. |

FOREIGN PATENT DOCUMENTS

| | | |
|---|---|---|
| JP | 2010-514986 | 5/2010 |
| JP | 2010-515181 | 5/2010 |

OTHER PUBLICATIONS

Werbos, "Backpropagation Through Time: What It Does and How to Do It," Proceedings of the IEEE (Oct. 1990), 78:1550-60.

Li et al., "Constructing Long Short-Term Memory Based Deep Recurrent Neural Networks for Large Vocabulary Speech Recognition," IEEE (2015), pp. 4520-4524.

FIG.5

PATTERN RECOGNITION APPARATUS, PATTERN RECOGNITION METHOD, AND COMPUTER PROGRAM PRODUCT

CROSS-REFERENCE TO RELATED APPLICATIONS

This application is based upon and claims the benefit of priority from Japanese Patent Application No. 2016-223333, filed on Nov. 16, 2016; the entire contents of which are incorporated herein by reference.

FIELD

Embodiments described herein relate generally to a pattern recognition apparatus, a pattern recognition method, and a computer program product.

BACKGROUND

A recurrent neural network (RNN) is generally formed of an input layer, one or a plurality of middle layers (RNN layers), and an output layer. When the RNN includes a plurality of RNN layers, the RNN layers are arranged successively from the lowermost layer to the uppermost layer such that an output of a layer below a certain layer serves as an input to the certain layer, and an output of the certain layer serves as an input to a layer above the certain layer. In this structure, an input to the lowermost RNN layer is an output of the input layer, and an output of the uppermost RNN layer serves as an input to the output layer. Each of the RNN layers is formed of one or a plurality of units.

When a feature vector series is input, an RNN calculates, for each input step, an output of the step using not only an input from the lower layer with respect to the step but also a recurrent input formed of an output of the RNN layer with respect to the previous step, in each RNN layer. Thus, RNNs are capable of pattern recognition reflecting a series pattern, and are used as pattern recognition apparatuses in various fields such as sound recognition, image recognition, character recognition, and natural language processing.

However, an RNN uses a recurrent input as well as input for calculation of output in each RNN layer serving as a middle layer, and involves increased computational complexity in comparison with a non-recurrent neural network that calculates an output only from an input in a middle layer. For this reason, studies are underway to reduce the computational complexity involved in recurrent neural networks. However, conventional methods have difficulty in efficiently reducing the computational complexity in recurrent neural networks, and improvement thereof has been called for.

DETAILED DESCRIPTION

According to an embodiment, a pattern recognition apparatus including at least one RNN layer serving as a middle layer forming a recurrent neural network between an input layer and an output layer, the pattern recognition apparatus being configured to output, from the output layer, a pattern series corresponding to a feature vector series input to the input layer. In the pattern recognition apparatus, the RNN layer includes an input converting unit and an RNN processor. The input layer successively outputs feature vectors forming the feature vector series one at a time for each step. The input converting unit of the RNN layer performs conversion, for each step, on an input vector and a recurrent input vector, and calculates and outputs a converted vector of which the number of dimensions is smaller than the sum of the number of dimensions of the input vector and the number of dimensions of the recurrent input vector, the input vector being formed of the feature vector output from the input layer or an output of the RNN processor included in the lower RNN layer, the recurrent input vector being formed of an output of a previous step of the RNN processor included in the RNN layer. The RNN processor of the RNN layer calculates an RNN output vector from the converted vector calculated in the input converting unit included in the RNN layer and outputs the RNN output vector, for each step. And the output layer calculates the pattern series from the RNN output vector calculated in the RNN processor included in an uppermost layer of the RNN layer and outputs the pattern series.

The following describes in detail a pattern recognition apparatus, a pattern recognition method, and a computer program according to each embodiment with reference to the attached drawings. The pattern recognition apparatus according to the embodiment is a pattern recognition apparatus using a recurrent neural network. Specifically, the pattern recognition apparatus according to the embodiment includes one or more RNN layers serving as middle layers forming a recurrent neural network between an input layer and an output layer, and outputs a pattern series corresponding to a feature vector series input to the input layer, from the output layer.

Each of the RNN layers calculates, at each step input, an output of the step using not only an input from the lower layer with respect to the step but also a recurrent input formed of an output of the RNN layer with respect to the previous step. With the structure, the pattern recognition apparatus using a recurrent neural network including RNN layers as middle layers is capable of pattern recognition reflecting a pattern of the series.

In addition, a long short-term memory (LSTM) serving as a type of recurrent neural networks uses, for example, a memory cell called an LSTM block including an input gate that controls input, a forget gate that controls memory, and an output gate that controls output, instead of a unit of the typical RNN layer. A pattern recognition apparatus using an LSTM as an RNN layer is capable of holding memory for a long term by controlling input, memory, and output with the input gate, the forget gate, and the output gate, and capable of pattern recognition reflecting a long-term series pattern, which is difficult for a pattern recognition apparatus using an usual RNN layer.

However, a recurrent neural network uses not only an input but also a recurrent input for calculation of an output as described above, and has a problem of increase in computational complexity in comparison with a non-recurrent neural network that calculates an output only from an input. In particular, because a gate output is calculated in an LSTM using an input and a recurrent input in each gate, the LSTM has a problem of marked increase in computational complexity.

To solve the problem, a method exists to reduce the computational complexity. The method uses a recurrent projection layer to generate, from the output of an RNN layer using an LSTM (hereinafter particularly referred to as "LSTM layer"), a recurrent projected output of which the number of dimensions is smaller than that of the output of the LSTM layer by using a recurrent projection layer, and uses the recurrent projected output as recurrent input to the LSTM layer at the subsequent step and input to the upper layer at the current step, to reduce the computational complexity.

However, this method requires determining the number of dimensions of the recurrent projected output of each LSTM layer in advance, is not capable of automatically optimizing allocation of the numbers of dimensions between the input and the recurrent output in each LSTM layer, and has difficulty in achieving efficient reduction in computational complexity. This method also has the problem that the number of dimensions of the input to the lowermost LSTM layer cannot be reduced. Although a method of using a deep autoencoder exists as a method for reducing number of dimensions of a feature vector to an RNN layer, even in a case using the method to reduce the number of dimensions of the input to the LSTM and the number of dimensions of the recurrent input formed of the recurrent projected output, it is required that the number of dimensions of the input and the number of dimensions of the recurrent input after reduction in the dimensions be determined in advance. For this reason, the method is not capable of automatically optimizing the allocation of the numbers of dimensions between the input and the recurrent input, and has difficulty in achieving efficient reduction in computational complexity.

For this reason, the pattern recognition apparatus according to an embodiment has a structure in which an RNN layer serving as a middle layer forming a recurrent neural network includes an input converting unit and an RNN processor, the input converting unit performs conversion on the input and the recurrent input to the RNN layer to generate a converted vector, and the RNN processor calculates an RNN output vector by using the converted vector. Specifically, the pattern recognition apparatus according to the embodiment has a structure in which the input converting unit of the RNN layer performs conversion on an input vector formed of a feature vector output from the input layer or an output of the RNN processor included in the lower RNN layer, and on a recurrent input vector formed of an output of the previous step of the RNN processor included in the RNN layer, for each step, to calculate and output a converted vector of which the number of dimensions is smaller than the sum of the number of dimensions of the input vector and the number of dimensions of the recurrent input vector. Thereafter, the RNN processor of the RNN layer calculates an RNN output vector from the converted vector calculated in the input converting unit included in the RNN layer and outputs the RNN output vector, for each step.

As described above, the pattern recognition apparatus according to the embodiment is configured to calculate a converted vector with the number of dimensions reduced by conversion on the input and the recurrent input to the RNN layer, calculate an RNN output vector from the converted vector, and output the RNN output vector. With this structure, the pattern recognition apparatus is capable of automatically optimizing allocation of the numbers of dimensions between the input and the recurrent input to the RNN layer after reduction in dimensions, and enables efficient reduction in computational complexity. The following is further detailed explanation of a specific example of the pattern recognition apparatus according to an embodiment, divided into a case using a typical RNN layer for the middle layer, and a case using an LSTM layer for the middle layer.

First Embodiment

Figure 1:
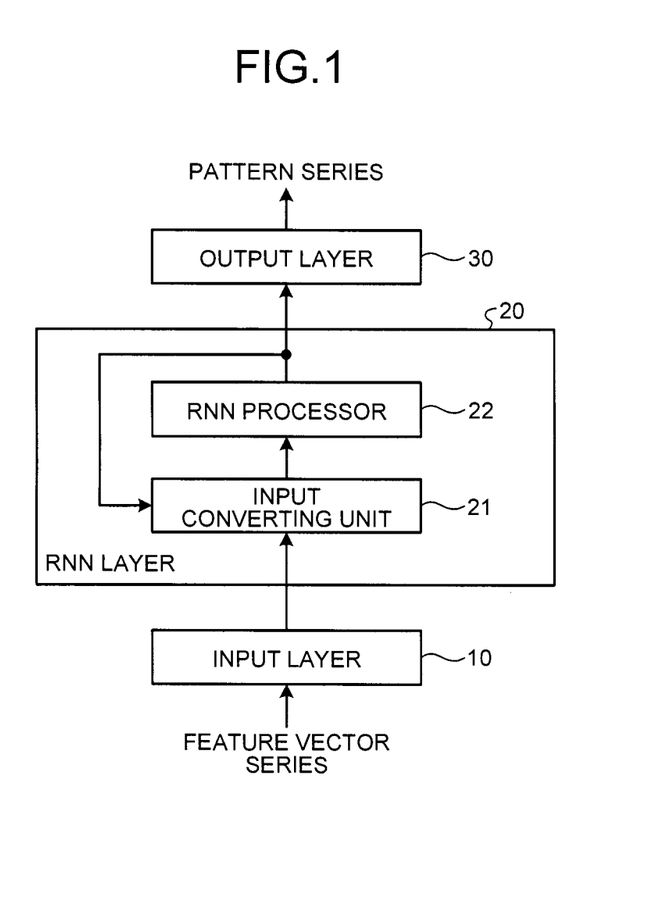
FIG. 1 is a block diagram illustrating a functional configuration example of a pattern recognition apparatus according to a first embodiment.

First, an example of a case using a typical RNN layer for the middle layer will be explained hereinafter as a first embodiment. FIG. 1 is a block diagram illustrating a functional configuration example of a pattern recognition apparatus according to the first embodiment. As illustrated in FIG. 1, the pattern recognition apparatus according to the present embodiment includes an input layer 10, an RNN layer 20, and an output layer 30, and the RNN layer 20 includes an input converting unit 21 and an RNN processor 22.

The input layer 10 receives a feature vector series, and successively outputs feature vectors forming the feature vector series one at a time for each step of the series.

The input converting unit 21 of the RNN layer 20 performs conversion on an input vector formed of the feature vector output from the input layer 10, and a recurrent input vector formed of an RNN output vector serving as an output of the previous step of the RNN processor 22, for each step, and calculates and outputs a converted vector of which the number of dimensions is smaller than the sum of the number of dimensions of the input vector and the number of dimensions of the recurrent input vector.

For example, the input converting unit 21 calculates a converted vector $v_t$ at a step t by Expression (1) given below, from an input vector $x_t$ at the step t and a recurrent input vector $m_{t-1}$.

$$v_t = W_{vx} \cdot x_t + W_{vm} \cdot m_{t-1} \qquad (1)$$

$W_{vx}$ is a weight matrix for the input vector $x_t$, and $W_{vm}$ is a weight matrix for the recurrent input vector $m_{t-1}$.

The number of dimensions of the input vector $x_t$ is set as N, the number of dimensions of the recurrent input vector $m_{t-1}$ is set as M, and the number of dimensions of the converted vector is set as I, to consider the constraint conditions for the number of dimensions I of the converted vector $v_t$ to achieve reduction in computational complexity.

In an RNN layer of a conventional ordinary neural network, an RNN output vector having M dimensions is calculated using the input vector $x_t$ having N dimensions and the recurrent input vector $m_{t-1}$ having M dimensions, and the computational complexity is expressed as "(N+M)·M". By contrast, in the RNN layer 20 of the present embodiment, first, in the input converting unit 21, the converted vector $v_t$ having I dimensions is calculated using the input vector $x_t$ having N dimensions and the recurrent input vector $m_{t-1}$ having M dimensions, and thereafter the RNN output vector having M dimensions is calculated from the converted vector $v_t$ having I dimensions. For this reason, the computational complexity can be expressed as "(N+M)·I+I·M". Accordingly, the present embodiment can reduce the computational complexity if (N+M)·I+I·M<(N+M)·M.

In view of the above, the number of dimensions I of the converted vector $v_t$ preferably satisfies the condition indicated in Expression (2) given below. Specifically, the input converting unit 21 preferably calculates and outputs the converted vector $v_t$ satisfying the condition indicated in Expression (2) given below.

$$I < \frac{(N+M) \cdot M}{N+2M} \quad (2)$$

The input converting unit 21 may calculate the converted vector $v_t$ as follows with $v_{xt}$, $v_{ct}$, and $v_{mt}$ denoting a component calculated only from the input vector $x_t$, a component calculated from the input vector $x_t$ and the recurrent input vector $m_{t-1}$, and a component calculated only from the recurrent input vector $m_{t-1}$, respectively, in the converted vector $v_t$ at the step t.

$$v_t = [v_{xt}^T, v_{ct}^T, v_{mt}^T]^T$$

$$v_{xt} = W_{vxi} \cdot x_t$$

$$v_{ct} = W_{vxc} \cdot x_t + W_{vmc} \cdot m_{t-1}$$

$$v_{mt} = W_{vmi} \cdot m_t$$

$\cdot^T$ is transpose of a matrix; each of $W_{vxi}$ and $W_{vxc}$ is a weight matrix for the input vector $x_t$; and each of $W_{vmc}$ and $W_{vmi}$ is a weight matrix for the recurrent input vector $m_{t-1}$.

Such linear transformation is called "non-fully connected linear transformation" for the sake of convenience. In the case of using non-fully connected linear transformation, with $I_x$, $I_c$, and $I_m$ denoting the number of dimensions of the component $v_{xt}$, the number of dimensions of the component $v_{ct}$, and the number of dimensions of the component $v_{mt}$, respectively, the computational complexity can be reduced if $(I_x+I_c) \cdot N + (I_m+I_c) \cdot M + I \cdot M < (N+M) \cdot M$, $(I-I_m) \cdot N + (I_c+I_m) \cdot M + I \cdot M < (N+M) \cdot M$, and "$(I-I_m) \cdot M + I \cdot M < (N+M) \cdot M$.

Accordingly, in the case of using non-fully connected linear transformation, the input converting unit 21 preferably calculates and outputs the converted vector $v_t$ satisfying the condition indicated in Expression (3) given below.

$$I < \frac{(N+M) \cdot M + I_m \cdot N + I_x \cdot M}{N + 2 \cdot M} \quad (3)$$

In the case of using non-fully connected linear transformation, there are cases where the computational complexity can be reduced even when the number of dimensions I of the converted vector $v_t$ is equal to or larger than the number of dimensions M of the recurrent input vector $m_{t-1}$ ($I \geq M$). However, it is at least required that the number of dimensions I of the converted vector $v_t$ be smaller than the sum of the number of dimensions N of the input vector $x_t$ and the number of dimensions M of the recurrent input vector $m_{t-1}$ ($I < N+M$). In addition, in the case of "$I_c = I$" and "$I_x = I_m = 0$", the expression is equivalent to Expression (1) given above.

The transformation described above is linear transformation, but transformation by the input converting unit 21 is not always linear transformation, but may be affine transformation or nonlinear transformation that can be optimized. For example, the input converting unit 21 may calculates the converted vector $v_t$ at the step t from the input vector $x_t$ at the step t and the recurrent input vector $m_{t-1}$, by Expression (4) given below.

$$v_t = k(W_{vx} \cdot x_t + W_{vm} \cdot m_{t-1} + b_v) \quad (4)$$

$k(\cdot)$ is a nonlinear function applied to each vector, such as a sigmoid function and a tanh function, $W_{vx}$ is a weight matrix for the input vector $x_t$, $W_{vm}$ is a weight matrix for the recurrent input vector $m_{t-1}$, and $b_v$ is a bias vector having I dimensions where the number of dimensions of the converted vector $v_t$ is I.

Also when the converted vector $v_t$ is calculated by nonlinear transformation of Expression (4), the constraint conditions for the number of dimensions I of the converted vector $v_t$ are the same as those for the case of calculating the converted vector $v_t$ by linear transformation of Expression (1). Specifically, the input converting unit 21 preferably calculates and outputs the converted vector $v_t$ satisfying the conditions indicated in Expression (2).

The input converting unit 21 may calculate the converted vector $v_t$ as follows with $v_{xt}$, $v_{ct}$, and $v_{mt}$ denoting a component calculated only from the input vector $x_t$, a component calculated from the input vector $x_t$ and the recurrent input vector $m_{t-1}$, and a component calculated only from the recurrent input vector $m_{t-1}$, respectively, in the converted vector $v_t$ at the step t.

$$v_t = [v_{xt}^T, v_{ct}^T, v_{mt}^T]^T$$

$$v_{xt} = k(W_{vxi} \cdot x_t + b_{vx})$$

$$v_{ct} = k(W_{vxc} \cdot x_t + W_{vmc} \cdot m_{t-1} + b_{vc})$$

$$v_{mt} = k(W_{vmi} \cdot m_t + b_{vm})$$

$\cdot^T$ is transpose of a matrix, $k(\cdot)$ is a nonlinear function applied to each vector, each of $W_{vxi}$ and $W_{vxc}$ is a weight matrix for the input vector $x_t$, each of $W_{vmi}$ and $W_{vmc}$ is a weight matrix for the recurrent input vector $m_{t-1}$, $b_{vx}$ is a bias vector having $I_x$ dimensions where the number of dimensions of the component $v_{xt}$ of the converted vector is $I_x$, $b_{vc}$ is a bias vector having $I_c$ dimensions where the number of dimensions of the component $v_{ct}$ of the converted vector is $I_c$, and $b_{vm}$ is a bias vector having $I_m$ dimensions where the number of dimensions of the component $v_{mt}$ of the converted vector is $I_m$.

Such linear transformation is called "non-fully connected nonlinear transformation" for the sake of convenience. In the case of using non-fully connected nonlinear transformation, the input converting unit 21 preferably calculates and outputs the converted vector $v_t$ satisfying the conditions indicated in Expression (3), in the same manner as the case of using the non-fully connected linear transformation described above.

The RNN processor 22 of the RNN layer 20 calculates an RNN output vector from the converted vector calculated by the input converting unit 21, for each step, using Expression (5) given below.

$$m_t = \sigma(W_{mv} \cdot v_t + b_m) \quad (5)$$

where $m_t$ is an RNN output vector at the step t; $v_t$ is a converted vector at the step t; $W_{mv}$ is a weight matrix for the converted vector $v_t$, $b_m$ is a bias vector; and $\sigma(\cdot)$ is a nonlinear function applied for each element of the vector. Generally, a sigmoid function or a tanh function is used as $\sigma(\cdot)$, but another nonlinear function may be used.

The output layer 30 calculates a pattern series from the RNN output vector calculated in the RNN processor 22. When the pattern series is an N-dimension score vector series in the N-class identification problem, the score vector $y_t$ at the step t is calculated, for example, using Expression (6)

$$y_t = W_{ym} \cdot m_t + b_y \qquad (6)$$

where: $W_{ym}$ is a weight matrix for calculating a score vector; and $b_y$ is a bias vector.

The pattern series need not necessarily be a score vector series, but may be a posterior probability vector series or an index series of a class with the maximum score. When the pattern series is a posterior probability vector series, a posterior probability vector $z_t$ at the step t is calculated using Expression (7) given below, for example, from the score vector $y_t$.

$$z_t = \text{soft max}(y_t) \qquad (7)$$

where: softmax(•) is a softmax function; and each element $z_t(n)$ of the posterior probability vector $z_t$ is calculated from each element $y_t(n)$ of the score vector $y_t$ using Expression (8), where J is the number of dimensions of $y_t$.

$$Z_t(n) = \frac{\exp(y_t(n))}{\sum_{j=1}^{J} \exp(y_t(j))} \qquad (8)$$

In the case where the pattern series is an index series of a class with the maximum score, an index $\tilde{n}_t$ at the step t is calculated using Expression (9) given below, for example, from each element $y_t(n)$ of the score vector $y_t$.

$$\tilde{n}_t = \arg\max_n(y_t(n)) \qquad (9)$$

where $\text{Argmax}_n(y_t(n))$ is a function to calculate an index of the element having the maximum value in the elements $y_t(n)$ of the score vector $y_t$.

In the pattern recognition apparatus according to the present embodiment, the weight matrixes used by the input converting unit 21 of the RNN layer 20 for calculating the converted vector $v_t$, that is, the weight matrixes $W_{vx}$ and $W_{xm}$ in Expression (1) or Expression (5) described above can be optimized using learning data, for example, by the method disclosed in the following reference document.
<Reference Document> P. J. Werbos, "Backpropagation Through Time: What it Does and How to Do It", Proceedings of the IEEE, vol. 78, no. 10, pp. 1550-1560, October 1990.

The pattern recognition apparatus according to the present embodiment has the structure in which the input converting unit 21 of the RNN layer 20 calculates the converted vector $v_t$ using one of the linear transformation, non-fully connected linear transformation, nonlinear transformation, and non-fully connected nonlinear transformation described above. This structure enables automatic determination as to which of the input vector $x_t$ and the recurrent input vector $m_{t-1}$ should be provided with a larger weight, by using learning data, and enables automatic optimization of the allocation of the numbers of dimensions between the input vector $x_t$ and the recurrent input vector $m_{t-1}$ for the converted vector $v_t$.

Figure 2:
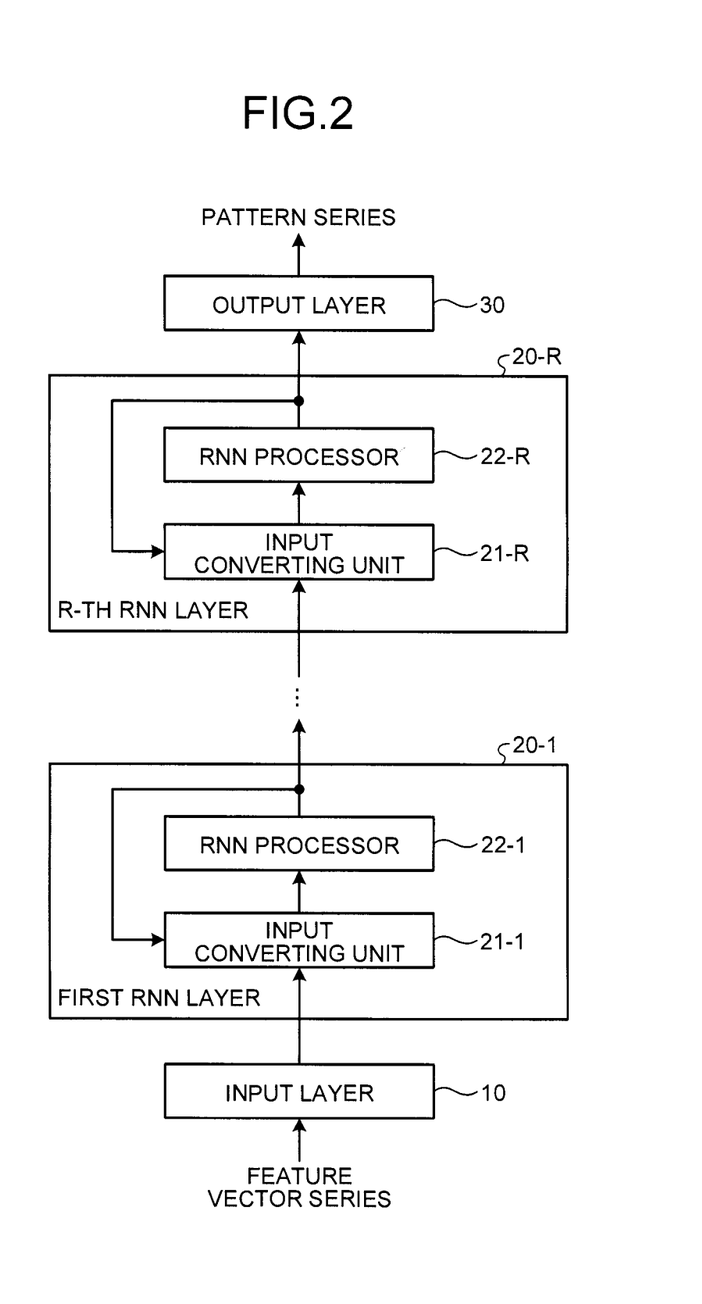
FIG. 2 is a block diagram illustrating a configuration example of a case including a plurality of RNN layers.

The present embodiment illustrates the case including one RNN layer 20, but a plurality of RNN layers 20 (the first RNN layer 20-1, . . . , the R-th RNN layer 20-R) may be provided between the input layer 10 and the output layer 30, as illustrated in FIG. 2. As illustrated in FIG. 2, with R denoting the number of RNN layers 20, the RNN layers are arranged in order from the first RNN layer 20-1 serving as the lowest layer to the R-th RNN layer 20-R serving as the highest layer such that the output of the lower RNN layer 20 serves as the input to the upper RNN layer 20, the feature vector output from the input layer 10 serves as the input vector of the input converting unit 21-1 of the first RNN layer 20-1, and the RNN output vector output from the RNN processor 22-1 of the first RNN layer 20-1 serves as the input vector of the input converting unit 21-2 of the second RNN layer 20-2 higher than the first RNN layer 20-1.

In the same manner, the RNN output vector output from the RNN processor 22-r of the r-th RNN layer 20-r ($1 \le r < R$) serves as the input vector of the input converting unit 21-(r+1) of the (r+1)-th RNN layer 20-(r+1), and the RNN output vector output from the RNN processor 22-R of the uppermost R-th RNN layer 20-R is input to the output layer 30. When transformation in the input converting unit 21 of each RNN layer 20 is optimized using learning data, optimum allocation of the numbers of dimensions between the input vector and the recurrent input vector is automatically determined in each of the RNN layers 20.

In the pattern recognition apparatus including a plurality of RNN layers 20 as described above, when the input converting unit 21 of the RNN layer 20 calculates a converted vector using the linear transformation indicated in Expression (1) or the nonlinear transformation indicated in Expression (4), the computational complexity can be reduced if Expression (10) given below is satisfied with: $I_r$ denoting the number of dimensions of the converted vector $v_{rt}$ calculated in the r-th RNN layer 20-r ($1 \le r \le R$); $N_r$ denoting the number of dimensions of the input vector of the r-th RNN layer 20-r; and $M_r$ denoting the number of dimensions of the recurrent input vector of the r-th RNN layer 20-r.

$$\sum_{r=1}^{R} \{(N_r + M_r) \cdot I_r + I_r \cdot M_r\} < \sum_{r=1}^{k} \{(N_r + M_r) \cdot M_r\} \qquad (10)$$

Accordingly, the number of dimensions of the converted vector $v_{rt}$ of the r-th RNN layer 20-r preferably satisfies the condition indicated in Expression (11) given below. Specifically, the input converting unit 21 preferably calculates and outputs a converted vector $v_{rt}$ satisfying the condition indicated in Expression (11) given below.

$$\sum_{r=1}^{R} ((N_r + 2 \cdot M_r) \cdot I_r) < \sum_{r=1}^{R} ((N_r + M_r) \cdot M_r) \qquad (11)$$

In the pattern recognition apparatus including a plurality of RNN layers 20 as described above, when the input converting unit 21 of the RNN layer 20 calculates a converted vector using the non-fully connected linear transformation or the non-fully connected nonlinear transformation described above, the computational complexity can be reduced if Expression (12) or Expression (13) equivalent thereto, given below, is satisfied with: $I_r$ denoting the number of dimensions of the converted vector $v_{rt}$ calculated in the r-th RNN layer 20-r ($1 \le r \le R$); $N_r$ denoting the number of dimensions of the input vector of the r-th RNN layer 20-r; $M_r$ denoting the number of dimensions of the recurrent input vector of the r-th RNN layer 20-r; and $I_{rx}$, $I_{rc}$, and $I_{rm}$ denoting the number of dimensions of the component calculated only from the input vector, the number of dimensions of the component calculated from the input vector and the recurrent input vector, and the number of dimensions of the component calculated only from the recurrent input vector, respectively, in the converted vector $v_{rt}$ calculated in the r-th RNN layer 20-r.

$$\sum_{r=1}^{R}((I_{rx}+I_{rc})\cdot N_r + (I_{rm}+I_{rc})\cdot M_r + I_r \cdot M_r) < \sum_{r=1}^{R}((N_r + M_r)\cdot M_r) \quad (12)$$

$$\sum_{r=1}^{R}((I_r-I_{rm})\cdot N_r + (I_r - I_{rx})\cdot M_r + I_r \cdot M_r) < \sum_{r=1}^{R}((N_r + M_r)\cdot M_r) \quad (13)$$

Accordingly, the number of dimensions $I_r$ of the converted vector $v_{rt}$ of the r-th RNN layer 20-r preferably satisfies the condition indicated in Expression (14) given below. Specifically, the input converting unit 21 preferably calculates and outputs a converted vector $v_{rt}$ satisfying the condition indicated in Expression (14) given below.

$$\sum_{r=1}^{R}((N_r + 2\cdot M_r)\cdot I_r) < \sum_{r=1}^{R}((N_r + M_r)\cdot M_r + I_{rm}\cdot N_r + I_{rx}\cdot M_r) \quad (14)$$

The structure of the pattern recognition apparatus described above can be variously modified within a range not departing from the gist of the invention. For example, desired processing may be added between the input layer 10 and the input converting unit 21 of the RNN layer 20, and the output vector of the added processing may be used as part or whole of the input vector of the input converting unit 21. Desired processing may be added between the RNN processor 22 of the RNN layer 20 and the output layer 30, and the output vector of the added processing may be used as part or whole of the input vector of the output layer 30. In addition, the output layer 30 may output the RNN output vector calculated in the RNN processor 22 of the RNN layer 20, as a pattern series without any processing.

As described above, the pattern recognition apparatus according to the present embodiment has the structure in which the input converting unit 21 of the RNN layer 20 calculates a converted vector with a reduced number of dimensions by conversion on the input vector and the recurrent input vector. Thereafter, the RNN processor 22 of the RNN layer 20 calculates an RNN output vector from the converted vector calculated by the input converting unit 21 and outputs the RNN output vector. Accordingly, the pattern recognition apparatus according to the present embodiment reduces the computational complexity in the RNN layer 20 in comparison with a conventional recurrent neural network, while automatically optimizing the allocation of the numbers of dimensions between the input vector and the recurrent input vector to be input to the RNN layer 20, and achieves efficient reduction in computational complexity.

Second Embodiment

Figure 3:
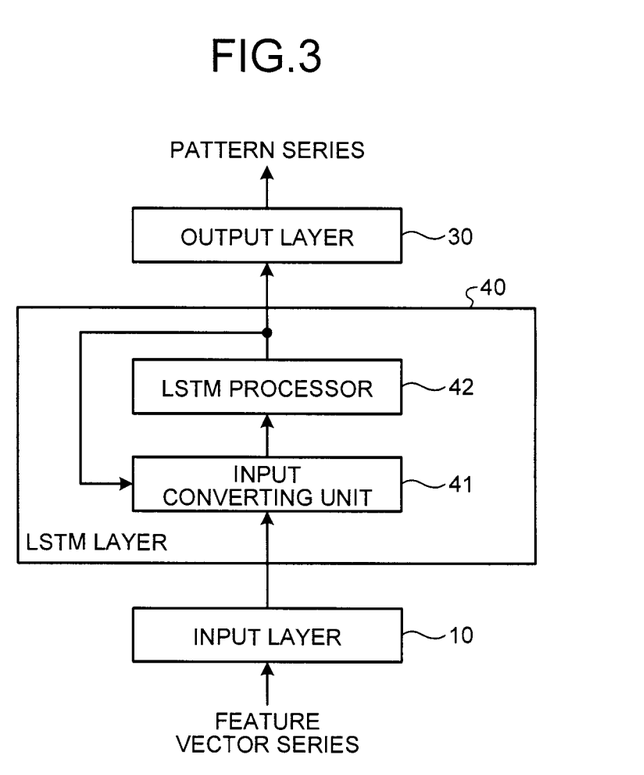
FIG. 3 is a block diagram illustrating a functional configuration example of a pattern recognition apparatus according to a second embodiment.

The following describes an example of a case using an ordinary LSTM layer as a middle layer, as a second embodiment. FIG. 3 is a block diagram illustrating a functional configuration example of a pattern recognition apparatus according to the second embodiment. As illustrated in FIG. 3, the pattern recognition apparatus according to the present embodiment includes an LSTM layer 40, instead of the RMM layer 20 of the first embodiment. Because the second embodiment is the same as the first embodiment except that the RNN layer 20 is replaced with the LSTM layer 40, only differences from the first embodiment will be explained hereinafter.

The LSTM layer 40 in the pattern recognition apparatus according to the present embodiment includes an input converting unit 41 and an LSTM processor 42, as illustrated in FIG. 3.

The input converting unit 41 of the LSTM layer 40 performs conversion on the input vector formed of the feature vector output from the input layer 10 and the recurrent input vector formed of an LSTM output vector serving as an output of the previous step of the LSTM processor 42 by using the linear transformation indicated in Expression (1), non-fully connected linear transformation, the nonlinear transformation indicated in Expression (4), or non-fully connected nonlinear transformation, for each step of the series, and calculates and outputs a converted vector of which the number of dimensions is smaller than the sum of the number of dimensions of the input vector and the number of dimensions of the recurrent input vector, in the same manner as the input converting unit 21 of the RNN layer 20 explained in the first embodiment. However, the present embodiment has different constraint conditions for the number of dimensions of the converted vector to achieve reduction in computational complexity, because the converted vector is used in the LSTM processor 42 for calculation in three gates, that is, an input gate, a forget gate, and an output gate, in addition to calculation for the input value, as described later.

When the input vector at a step t is $x_t$, the recurrent input vector is $m_{t-1}$, the converted vector is $v_t$, the number of dimensions of the input vector $x_t$ is N, the number of dimensions of the recurrent input vector $m_{t-1}$ is M, and the number of dimensions of the converted vector $v_t$ is I, the computational complexity for the input value and matrix calculation in the three gates in an LSTM layer having a conventional ordinary structure can be expressed as "4·(N+M)·M". By contrast, the computational complexity for the input value and matrix calculation in the three gates in the LSTM layer 40 of the present embodiment can be expressed as "(N+M)·I+4·I·M". Accordingly, the computational complexity can be reduced with the present embodiment if (N+M)·I+4·I·M<4·(N+M)·M.

In view of the above, when the converted vector $v_t$ is calculated using the linear transformation indicated in Expression (1) or the nonlinear transformation indicated in Expression (4), the number of dimensions I of the converted vector $v_t$ preferably satisfies the condition indicated in Expression (15) given below. Specifically, the input converting unit 41 of the LSTM layer 40 preferably calculates and outputs the converted vector $v_t$ satisfying the condition indicated in Expression (15) given below.

$$I < \frac{4\cdot(N+M)\cdot M}{N+5M} \quad (15)$$

In this case, there are cases where the computational complexity can be reduced even when the number of dimensions I of the converted vector $v_t$ is equal to or larger than the number of dimensions M of the recurrent input vector $m_{t-1}$ (I≥M), but it is at least required that the number of dimensions I of the converted vector $v_t$ is smaller than the sum of the number of dimensions N of the input vector $x_t$ and the number of dimensions M of the recurrent input vector $m_{t-1}$ (I<N+M).

In addition, in the case of calculating the converted vector $v_t$ by using the non-fully connected linear transformation or the non-fully connected nonlinear transformation described above, with $I_x$, $I_c$, and $I_m$ denoting the number of dimensions of the component $v_{xt}$, the number of dimensions of the component $v_{ct}$, and the number of dimensions of the component $v_{mt}$, respectively, the computational complexity for the input value and matrix calculation in the three gates in the LSTM layer 40 of the present embodiment can be expressed as "$(I_x+I_c)\cdot N+(I_c+I_m)\cdot M+4\cdot I\cdot M$", or "$(I-I_m)\cdot N+(I-I_c)\cdot M+4\cdot I\cdot M$", based on the relation "$I=I_x+I_c+I_m$".

Accordingly, in the case of calculating the converted vector $v_t$ using the non-fully connected linear transformation or the non-fully connected nonlinear transformation described above, the number of dimensions I of the converted vector $v_t$ preferably satisfies the condition indicated in Expression (16) given below. Specifically, the input converting unit 41 of the LSTM layer 40 preferably calculates and outputs the converted vector $v_t$ satisfying the condition indicated in Expression (16) given below.

$$I < \frac{4\cdot(N+M)\cdot M + I_m\cdot N + I_x\cdot M}{N+5M} \quad (16)$$

The LSTM processor 42 of the LSTM layer 40 calculates an LSTM output vector from the converted vector calculated by the input converting unit 41 by using Expressions (17) to (21) given below, for each step.

$$i_t = \sigma(W_{iv}\cdot v_t + w_{ic}\otimes c_{t-1} + b_i) \quad (17)$$

$$f_t = \sigma(W_{fv}\cdot v_t + w_{fc}\otimes c_{t-1} + b_f) \quad (18)$$

$$c_t = f_t\otimes c_{t-1} + i_t\otimes g(W_{cv}\cdot v_t + b_c) \quad (19)$$

$$o_t = \sigma(W_{ov}\cdot v_t + w_{oc}\otimes c_t + b_o) \quad (20)$$

$$m_t = o_t\otimes h(c_t) \quad (21)$$

($i_t$ is an input gate activation vector at the step t; $f_t$ is a forget gate activation vector at the step t; $c_t$ is a memory cell activation vector at the step t; $c_{t-1}$ is a memory cell activation vector at a step t−1; each of $W_{iv}$, $W_{fv}$, $W_{cv}$, and $W_{ov}$ is a weight matrix for the converted vector $v_t$; each of $w_{ic}$, $W_{fc}$, and $W_{oc}$ is a weight vector; each of $b_i$, $b_f$, $b_c$, and $b_o$ is a bias vector; $\otimes$ is element-wise multiplication; and each of $\sigma(\cdot)$, $g(\cdot)$, and $h(\cdot)$ is a nonlinear function applied to each element of the vector)

Generally, a sigmoid function is used as $\sigma(\cdot)$, and a tanh function is used as $g(\cdot)$ and $h(\cdot)$, but another nonlinear function may be used.

The output layer 30 calculates a pattern series from the LSTM output vector calculated in the LSTM processor 42 of the LSTM layer 40, in the same manner as the method of the first embodiment. Examples of the pattern series include an N-dimension score vector series in the N-class identification problem, posterior probability vector series, or an index series of a class with the maximum score.

The pattern recognition apparatus of the present embodiment also has the structure in which the input converting unit 41 of the LSTM layer 40 calculates a converted vector $v_t$ by using one of the linear transformation, non-fully connected linear transformation, nonlinear transformation, or non-fully connected nonlinear transformation described above. For this reason, in the same manner as the first embodiment, this structure enables automatic determination as to which of the input vector $x_t$ and the recurrent input vector $m_{t-1}$ should be provided with a larger weight, using learning data, and enables automatic optimization of the allocation of the numbers of dimensions between the input vector $x_t$ and the recurrent input vector $m_{t-1}$ for the converted vector $v_t$.

Figure 4:
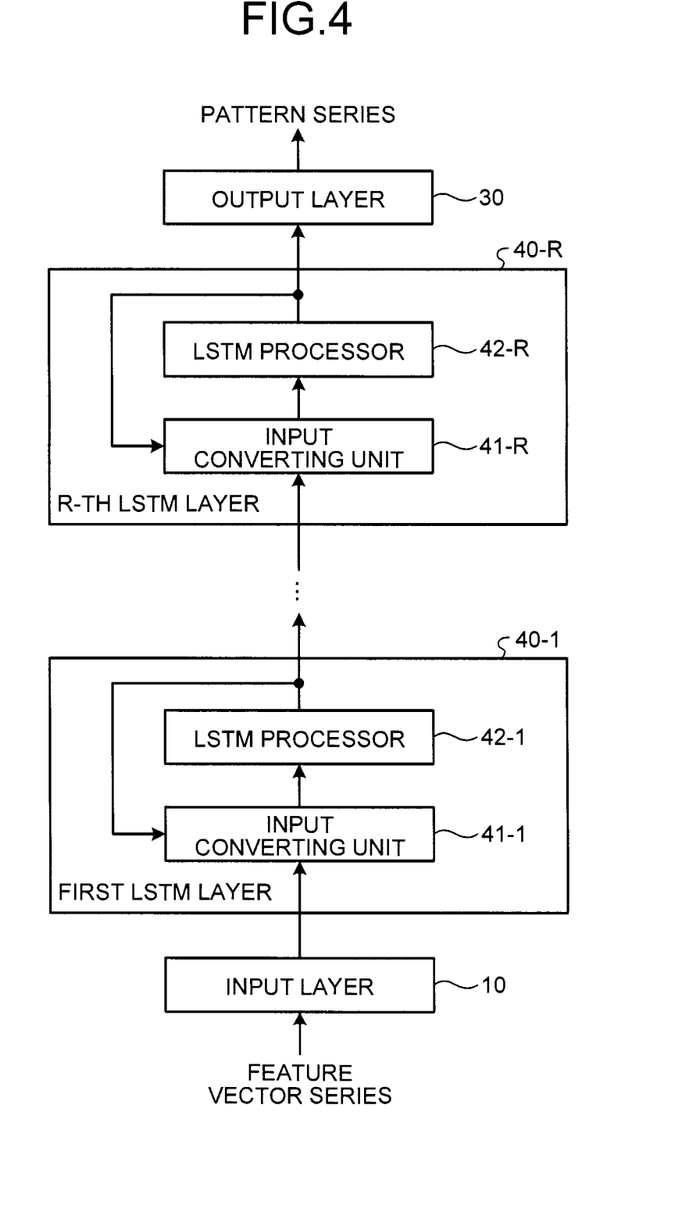
FIG. 4 is a block diagram illustrating a configuration example of a case including a plurality of long short-term memory (LSTM) layers.

The present embodiment illustrates the case of including one LSTM layer 40, but a plurality of LSTM layers 40 (a first LSTM layer 40-1, . . . , an R-th LSTM layer 40-R) may exist between the input layer 10 and the output layer 30, as illustrated in FIG. 4. As illustrated in FIG. 4, with R denoting the number of LSTM layers 40, the LSTM layers are arranged in order from the first LSTM layer 40-1 serving as the lowermost layer to the R-th LSTM layer 40-R serving as the uppermost layer such that the output of the lower LSTM layer 40 serves as the input to the upper LSTM layer 40, the feature vector output from the input layer 10 serves as the input vector of the input converting unit 41-1 of the first LSTM layer 40-1, and the LSTM output vector output from the LSTM processor 42-1 of the first LSTM layer 40-1 serves as the input vector of the input converting unit 41-2 of the second LSTM layer 40-2 higher than the first LSTM layer 40-1.

In the same manner, the LSTM output vector output from the LSTM processor 42-r of the r-th LSTM layer 40-r (1≤r<R) serves as the input vector of the input converting unit 41-(r+1) of the (r+1)-th LSTM layer 40-(r+1), and the LSTM output vector output from the LSTM processor 42-R of the uppermost R-th LSTM layer 40-R is input to the output layer 30. When transformation in the input converting unit 41 of each LSTM layer 40 is optimized by using learning data, optimum allocation of the numbers of dimensions between the input vector and the recurrent input vector is automatically determined in each of the LSTM layers 40.

In the pattern recognition apparatus including a plurality of LSTM layers 40 as described above, when the input converting unit 41 of the LSTM layer 40 calculates a converted vector by using the linear transformation indicated in Expression (1) or the nonlinear transformation indicated in Expression (4), the input converting unit 41 preferably calculates and outputs the converted vector $v_{rt}$ satisfying the condition indicated in Expression (22) given below with: $I_r$ denoting the number of dimensions of the converted vector $v_{rt}$ calculated in the r-th LSTM layer 40-r (1≤r≤R); $N_r$ denoting the number of dimensions of the input vector of the r-th LSTM layer 40-r; and $M_r$ denoting the number of dimensions of the recurrent input vector of the r-th LSTM layer 40-r.

$$\sum_{r=1}^{R}((N_r+5\cdot M_r)\cdot I_r) < \sum_{r=1}^{R}(4\cdot(N_r+M_r)\cdot M_r) \quad (22)$$

In the pattern recognition apparatus including a plurality of LSTM layers 40 as described above, when the input converting unit 41 of the LSTM layer 40 calculates a converted vector using the non-fully connected linear transformation or the non-fully connected nonlinear transformation described above, the input converting unit 41 preferably calculates and outputs the converted vector $v_{rt}$ satisfying the condition indicated in Expression (23) given below with: $I_r$ denoting the number of dimensions of the number of dimensions of the converted vector $v_{rt}$ calculated in the r-th LSTM layer 40-r (1≤r≤R); $N_r$ denoting the number of dimensions of the input vector of the r-th LSTM layer 40-r; $M_r$ denoting the number of dimensions of the recurrent input vector of the r-th LSTM layer 40-r; and $I_{rx}$, $I_{rc}$, and $I_{rm}$ denoting the number of dimensions of the component calculated only from the input vector, the number of dimensions of the component calculated from the input vector and the recurrent input vector, and the number of dimensions of the component calculated only from the recurrent input vector, respectively, in the converted vector $v_{rt}$ calculated in the r-th LSTM layer 40-*r*.

$$\sum_{r=1}^{R}((N_r + 5 \cdot M_r) \cdot I_r) < \sum_{r=1}^{R}(4 \cdot (N_r + M_r) \cdot M_r + I_{rm} \cdot N_r + I_{rx} \cdot M_r) \quad (23)$$

The structure of the pattern recognition apparatus described above can be variously modified without departing from the gist of the invention. For example, desired processing may be added between the input layer 10 and the input converting unit 41 of the LSTM layer 40, and the output vector of the added processing may be used as a part or the whole of the input vector of the input converting unit 41. Desired processing may be added between the LSTM processor 42 of the LSTM layer 40 and the output layer 30, and the output vector of the added processing may be used as part or whole of the input vector of the output layer 30. In addition, the output layer 30 may output the LSTM output vector calculated in the LSTM processor 42 of the LSTM layer 40, as a pattern series without any processing.

As described above, the pattern recognition apparatus according to the present embodiment has the structure in which the input converting unit 41 of the LSTM layer 40 calculates a converted vector with a reduced number of dimensions by conversion on the input vector and the recurrent input vector. Thereafter, the LSTM processor 42 of the LSTM layer 40 calculates a LSTM output vector from the converted vector calculated by the input converting unit 41 and outputs the LSTM output vector. Accordingly, the pattern recognition apparatus according to the present embodiment reduces the computational complexity in the LSTM layer 40 in comparison with a conventional recurrent neural network, while automatically optimizing the allocation of the numbers of dimensions between the input vector and the recurrent input vector to be input to the LSTM layer 40, and achieves efficient reduction in computational complexity.

Supplementary Explanation

The pattern recognition apparatus according to the embodiments described above can be achieved through cooperative operation between hardware forming an ordinary computer and a computer program (software) executed on the computer. For example, the input layer 10, the RNN layer 20 including the input converting unit 21 and the RNN processor 22, or the LSTM layer 40 including the input converting unit 41 and the LSTM processor 42, and the output layer 30 can be implemented with a predetermined computer program executed by the computer.

Figure 5:
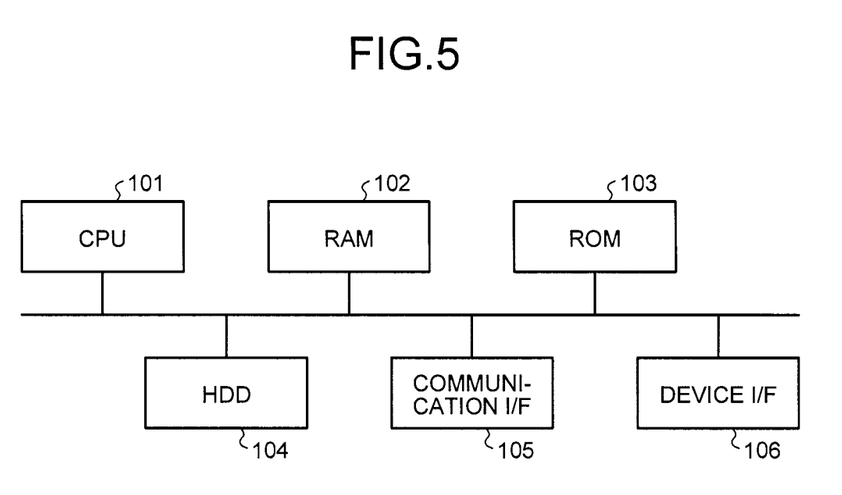
FIG. 5 is a block diagram illustrating a hardware configuration example of a pattern recognition apparatus according to an embodiment.

FIG. 5 is a block diagram illustrating a hardware configuration example of the pattern recognition apparatus according to an embodiment. For example, as illustrated in FIG. 5, the pattern recognition apparatus according to the embodiment has a hardware configuration as an ordinary computer, including a hardware processor such as a CPU 101, internal storage devices such as a RAM 102 and a ROM 103, an external storage device such as an HDD 104, a communication interface (I/F) 105 that communicates with an external device through a network, and a device I/F 106 to connect a peripheral device.

In the configuration example, the computer program described above is recorded on a recording medium such as a magnetic disk, an optical disk, a semiconductor memory, or the like and provided in the form of the recording medium. The recording medium having the computer program recorded thereon may have any storage form as long as it is a recording medium readable by a computer system. The computer program may be configured to be installed in the computer in advance, or the computer program may be configured to be distributed through a network and installed in the computer as appropriate.

The computer program to be executed by the computer has a module configuration including the functional constituent elements of the pattern recognition apparatus described above, and the units described above are generated on a main memory such as the RAM 102 with the computer program read and executed by the processor as appropriate.

The pattern recognition apparatus according to the embodiments may be configured to implement at least one or all of the functional units described above with dedicated hardware, such as an application specific integrated circuit (ASIC) and a field-programmable gate array (FPGA). The pattern recognition apparatus according to each embodiment may be a virtual machine operating on a cloud system.

In addition, technical feature of the embodiments may be used for, for example, such as sound recognition, image recognition, character recognition, natural language processing, and translation. Fields where the technical feature can be used are not limited to the above techniques, the technical feature of the embodiments also may be used in general fields of time series data processing such as consumer sentiment analysis, prediction of passenger numbers, and the rest.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes may be made without departing from the spirit of the inventions. The accompanying claims and their equivalents are intended to cover the embodiments described herein and their modifications as would fall within the scope and spirits of the invention.

What is claimed is:

1. A pattern recognition apparatus including at least one recurrent neural network (RNN) layer serving as a middle layer forming a recurrent neural network between an input layer and an output layer, the pattern recognition apparatus being configured to output, from the output layer, a pattern series corresponding to a feature vector series input to the input layer, wherein the RNN layer includes an input converting unit and an RNN processor, the input layer successively outputs feature vectors forming the feature vector series one at a time for each step, the input converting unit of the RNN layer performs conversion, for each step, on an input vector and a recurrent input vector, and calculates and outputs a converted vector of which the number of dimensions (I) is smaller than the sum of the number of dimensions (N) of the input vector and the number of dimensions (M) of the recurrent input vector, the input vector being formed of the feature vector output from the input layer or an output of the RNN processor included in the lower RNN layer, the recurrent input vector being formed of an output of a previous step of the RNN processor included in the RNN layer, the number of dimensions (I) of the converted vector satisfying a condition indicated in Expression $$I < \frac{(N+M) \cdot M}{N + 2M},$$

the RNN processor of the RNN layer calculates an RNN output vector from the converted vector calculated in the input converting unit included in the RNN layer and outputs the RNN output vector, for each step, and the output layer calculates the pattern series from the RNN output vector calculated in the RNN processor included in an uppermost layer of the RNN layer and outputs the pattern series, wherein the input converting unit calculates the converted vector $v_t$ at a step t, from the input vector $x_t$ at the step t and the recurrent input vector $m_{t-1}$, with $$v_t = W_{vx} \cdot x_t + W_{vm} \cdot m_{t-1}$$

($W_{vx}$ is a weight matrix for the input vector $x_t$; and $W_{vm}$ is a weight matrix for the recurrent input vector $m_{t-1}$), or $$v_t = k(W_{vx} \cdot x_t + W_{vm} \cdot m_{t-1} + b_v)$$

($k(\bullet)$ is a nonlinear function applied to each vector; $W_{vx}$ is a weight matrix for the input vector $x_t$, $W_{vm}$ is a weight matrix for the recurrent input vector $m_{t-1}$; by is a bias vector having I dimensions where the number of dimensions of the converted vector $v_t$ is I).

2. The apparatus according to claim 1, wherein the RNN processor calculates the RNN output vector mt at the step t from the converted vector $v_t$ at the step t with $$m_t = \sigma(W_{mv} \cdot v_t + b_m)$$

($W_{mv}$ is a weight matrix for the converted vector $v_t$; $b_m$ is a bias vector; and $\sigma(\bullet)$ is a nonlinear function applied to each element of the vector).

3. The apparatus according to claim 2, wherein, when the number of RNN layers is 1, the input converting unit calculates and outputs the converted vector satisfying the condition of $$I < \frac{(N+M) \cdot M}{N + 2M}$$

with: N denoting the number of dimensions of the input vector; M denoting the number of dimensions of the recurrent input vector; and I denoting the number of dimensions of the converted vector.

4. The apparatus according to claim 2, wherein, when the number of RNN layers is R (R is 2 or a higher integer), the input converting unit calculates and outputs the converted vector satisfying a condition of $$\sum_{r=1}^{R} ((N_r + 2 \cdot M_r) \cdot I_r) < \sum_{r=1}^{R} ((N_r + M_r) \cdot M_r)$$

with: $N_r$ denoting the number of dimensions of the input vector of an r-th layer ($1 \leq r \leq R$) at the step t; $M_r$ denoting the number of dimensions of the recurrent input vector; and $I_r$ denoting the number of dimensions of the converted vector.

5. The apparatus according to claim 1, wherein the RNN processor is a long short-term memory (LSTM), and calculates the RNN output vector mt at the step t from the converted vector $v_t$ with $$i_t = \sigma(W_{iv} \cdot v_t + w_{ic} \otimes c_{t-1} + b_i)$$

$$f_t = \sigma(W_{fv} \cdot v_t + w_{fc} \otimes c_{t-1} + b_f)$$

$$c_t = f_t \otimes c_{t-1} + i_t \otimes g(W_{cv} \cdot v_t + b_c)$$

$$o_t = \sigma(W_{ov} \cdot v_t + w_{oc} \otimes c_t + b_o)$$

$$m_t = o_t \otimes h(c_t)$$

($i_t$ is an input gate activation vector at the step t; $f_t$ is a forget gate activation vector at the step t; $c_t$ is a memory cell activation vector at the step t; $c_{t-1}$ is a memory cell activation vector at a step t−1; each of $W_{iv}$, $W_{fv}$, $W_{cv}$, and $W_{ov}$ is a weight matrix for the converted vector $v_t$; each of $w_{ic}$, $w_{fc}$, and $w_{oc}$ is a weight vector; each of $b_i$, $b_f$, $b_c$, and $b_o$ is a bias vector; $\otimes$ is element-wise multiplication; and each of $\sigma(\bullet)$, $g(\bullet)$ and $h(\bullet)$ is a nonlinear function applied to each element of the vector).

6. The apparatus according to claim 5, wherein, when the number of RNN layers is 1, the input converting unit calculates and outputs the converted vector satisfying a condition of $$I < \frac{4 \cdot (N+M) \cdot M}{N + 5M}$$

with: N denoting the number of dimensions of the input vector; M denoting the number of dimensions of the recurrent input vector; and I denoting the number of dimensions of the converted vector.

7. The apparatus according to claim 5, wherein, when the number of RNN layers is R (R is 2 or a higher integer), the input converting unit calculates and outputs the converted vector satisfying a condition of $$\sum_{r=1}^{R} ((N_r + 5 \cdot M_r) \cdot I_r) < \sum_{r=1}^{R} (4 \cdot (N_r + M_r) \cdot M_r)$$

with: $N_r$ denoting the number of dimensions of the input vector of an r-th layer ($1 \leq r \leq R$) at the step t; $M_r$ denoting the number of dimensions of the recurrent input vector; and $I_r$ denoting the number of dimensions of the converted vector.

8. The apparatus according to claim 1, wherein the input converting unit calculates the converted vector $v_t$ with $$v_t = [v_{xt}^T, v_{ct}^T, v_{mt}^T]^T$$

$$v_{xt} = W_{vxi} \cdot x_t$$

$$v_{ct} = W_{vxc} \cdot x_t + W_{vmc} \cdot m_{t-1}$$

$$v_{mt} = W_{vmi} \cdot m_t$$

($\bullet^T$ is a transpose of a matrix; each of $W_{vxi}$ and $W_{vxc}$ is a weight matrix for the input vector $x_t$; and each of $W_{vmi}$ and $W_{vmc}$ is a weight matrix for the recurrent input vector $m_{t-1}$), or $$v_t = [v_{xt}^T, v_{ct}^T, v_{mt}^T]^T$$

$$v_{xt} = k(W_{vxi} \cdot x_t + b_{vx})$$

$$v_{ct} = k(W_{vxc} \cdot x_t + W_{vmc} \cdot m_{t-1} + b_{vc})$$

$$v_{mt} = k(W_{vmi} \cdot m_t + b_{vm})$$

($\bullet^T$ is a transpose of a matrix; $k(\bullet)$ is a nonlinear function applied to each vector; each of $W_{vxi}$ and $W_{vxc}$ is a weight matrix for the input vector $x_t$; each of $W_{vmi}$ and $W_{vmc}$ is a weight matrix for the recurrent input vector $m_{t-1}$; $b_{vx}$ is a bias vector having $I_x$ dimensions where the number of dimensions of a component $v_{xt}$ of the converted vector is $I_x$; $b_{vc}$ is a bias vector having $I_c$ dimensions where the number of dimensions of a component $v_{ct}$ of the converted vector is $I_c$; and $b_{vm}$ is a bias vector having $I_m$ dimensions where the number of dimensions of a component $v_{mt}$ of the converted vector is $I_m$) with $v_{xt}$, $v_{ct}$, and $v_{mt}$ denoting a component calculated only from the input vector $x_t$ at a step t, a component calculated from the input vector xt and the recurrent input vector $m_{t-1}$, and a component calculated only from the recurrent input vector $m_{t-1}$, respectively, in the converted vector $v_t$ at the step t.

9. The apparatus according to claim 8, wherein the RNN processor calculates the RNN output vector mt at the step t from the converted vector $v_t$ at the step t with $$m_t = \sigma\sigma(W_{mv} \cdot v_t + b_m)$$

($W_{mv}$ is a weight matrix for the converted vector $v_t$; $b_m$ is a bias vector; and $\sigma(\bullet)$ is a nonlinear function applied to each element of the vector).

10. The apparatus according to claim 9, wherein, when the number of RNN layers is 1, the input converting unit calculates and outputs the converted vector that satisfies a condition of $$I < \frac{(N+M) \cdot M + I_m \cdot N + I_x \cdot M}{N + 2 \cdot M}$$

with: N denoting the number of dimensions of the input vector; M denoting the number of dimensions of the recurrent input vector; I denoting the number of dimensions of the converted vector; and $I_x$ and $I_m$ denoting the number of dimensions of the component calculated only from the input vector and the number of dimensions calculated only from the recurrent input vector, respectively, in the converted vector.

11. The apparatus according to claim 9, wherein, when the number of RNN layers is R (R is 2 or a higher integer), the input converting unit calculates and outputs the converted vector satisfying a condition of $$\sum_{r=1}^{R}((N_r + 2 \cdot M_r) \cdot I_r) < \sum_{r=1}^{R}((N_r + M_r) \cdot M_r + I_{rm} \cdot N_r + I_{rx} \cdot M_r)$$

with: $N_r$ denoting the number of dimensions of the input vector of an r-th layer ($1 \leq r \leq R$) at the step t; $M_r$ denoting the number of dimensions of the recurrent input vector; $I_r$ denoting the number of dimensions of the converted vector; and $I_{rx}$, $I_{rc}$, and $I_{rm}$ denoting the number of dimensions of the component calculated only from the input vector, the number of dimensions of the component calculated from the input vector and the recurrent input vector, and the number of dimensions calculated only from the recurrent input vector, respectively, in the converted vector.

12. The apparatus according to claim 8, wherein the RNN processor is a long short-term memory (LSTM), and calculates the RNN output vector mt at the step t from the converted vector $v_t$ with $$i_t = \sigma(W_{iv} \cdot v_t + w_{ic} \otimes c_{t-1} + b_i)$$

$$f_t = \sigma(W_{fv} \cdot v_t + w_{fc} \otimes c_{t-1} + b_f)$$

$$c_t = f_t \otimes c_{t-1} + i_t \otimes g(W_{cv} \cdot v_t + b_c)$$

$$o_t = \sigma(W_{ov} \cdot v_t + w_{oc} \otimes c_t + b_o)$$

$$m_t = o_t \otimes h(c_t)$$

($i_t$ is an input gate activation vector at the step t; $f_t$ is a forget gate activation vector at the step t; $c_t$ is a memory cell activation vector at the step t; $c_{t-1}$ is a memory cell activation vector at a step t−1; each of $W_{iv}$, $W_{fv}$, $W_{cv}$, and $W_{ov}$ is a weight matrix for the converted vector $v_t$; each of $w_{ic}$, $w_{fc}$, and $w_{oc}$ is a weight vector; each of $b_i$, $b_f$, $b_c$, and $b_o$ is a bias vector; $\otimes$ is element-wise multiplication; and each of $\sigma(\bullet)$, $g(\bullet)$ and $h(\bullet)$ is a nonlinear function applied to each element of the vector).

13. The apparatus according to claim 12, wherein, when the number of RNN layers is 1, the input converting unit calculates and outputs the converted vector satisfying a condition of $$I < \frac{4 \cdot (N+M) \cdot M + I_m \cdot N + I_x \cdot M}{N + 5M}$$

with: N denoting the number of dimensions of the input vector; M denoting the number of dimensions of the recurrent input vector; I denoting the number of dimensions of the converted vector; and $I_x$ and $I_m$ denoting the number of dimensions of the component calculated only from the input vector and the number of dimensions calculated only from the recurrent input vector, respectively, in the converted vector.

14. The apparatus according to claim 12, wherein, when the number of RNN layers is R (R is 2 or a higher integer), the input converting unit calculates and outputs the converted vector satisfying a condition of $$\sum_{r=1}^{R}((N_r + 5 \cdot M_r) \cdot I_r) < \sum_{r=1}^{R}(4 \cdot (N_r + M_r) \cdot M_r + I_{rm} \cdot N_r + I_{rx} \cdot M_r)$$

with: $N_r$ denoting the number of dimensions of the input vector of an r-th layer ($1 \leq r \leq R$) at the step t; $M_r$ denoting the number of dimensions of the recurrent input vector; $I_r$ denoting the number of dimensions of the converted vector; and $I_{rx}$, $I_{rc}$, and $I_{rm}$ denoting the number of dimensions of the component calculated only from the input vector, the number of dimensions of the component calculated from the input vector and the recurrent input vector, and the number of dimensions calculated only from the recurrent input vector, respectively, in the converted vector.

15. A pattern recognition method executed by a pattern recognition apparatus including at least one recurrent neural network (RNN) layer serving as a middle layer forming a recurrent neural network between an input layer and an output layer, the pattern recognition apparatus being configured to output, from the output layer, a pattern series corresponding to a feature vector series input to the input layer, wherein the RNN layer includes an input converting unit and an RNN processor, the pattern recognition method comprising:

successively outputting, by the input layer, feature vectors forming the feature vector series one at a time for each step, performing conversion, by the input converting unit of the RNN layer, for each step, on an input vector and a recurrent input vector, and calculating and outputting a converted vector of which the number of dimensions (I) is smaller than the sum of the number of dimensions (N) of the input vector and the number of dimensions (M) of the recurrent input vector, the input vector being formed of the feature vector output from the input layer or an output of the RNN processor included in the lower RNN layer, the recurrent input vector being formed of an output of a previous step of the RNN processor included in the RNN layer, the number of dimensions (I) of the converted vector satisfying a condition indicated in Expression $$I < \frac{(N+M) \cdot M}{N+2M},$$

by the RNN processor of the RNN layer, calculating an RNN output vector from the converted vector calculated in the input converting unit included in the RNN layer and outputting the RNN output, for each step, and by the output layer, calculating the pattern series from the RNN output vector calculated in the RNN processor included in an uppermost layer of the RNN layer and outputting the pattern series, wherein the input converting unit calculates the converted vector $v_t$ at a step t, from the input vector $x_t$ at the step t and the recurrent input vector $m_{t-1}$, with $$v_t = W_{vx} \cdot x_t + W_{vm} \cdot m_{t-1}$$

($W_{vx}$ is a weight matrix for the input vector $x_t$; and $W_{vm}$ is a weight matrix for the recurrent input vector $m_{t-1}$), or $$v_t = k(W_{vx} \cdot x_t + W_{cm} \cdot m_{t-1} + b_v)$$

(k(•) is a nonlinear function applied to each vector; $W_{vx}$ is a weight matrix for the input vector $x_t$, $W_{vm}$ is a weight matrix for the recurrent input vector $m_{t-1}$; $b_v$ is a bias vector having I dimensions where the number of dimensions of the converted vector $v_t$ is I).

16. A non-transitory computer program product having a computer readable medium including programmed instructions, wherein the instructions, when executed by a computer, cause the computer to function as a pattern recognition apparatus including at least one recurrent neural network (RNN) layer serving as a middle layer forming a recurrent neural network between an input layer and an output layer, the pattern recognition apparatus being configured to output, from the output layer, a pattern series corresponding to a feature vector series input to the input layer, the RNN layer including an input converting unit and an RNN processor, the instruction being configured to cause the computer to execute:

successively outputting, by the input layer, feature vectors forming the feature vector series one at a time for each step, performing conversion, by the input converting unit of the RNN layer, for each step, on an input vector and a recurrent input vector, and calculating and outputting a converted vector of which the number of dimensions (I) is smaller than the sum of the number of dimensions (N) of the input vector and the number of dimensions (M) of the recurrent input vector, the input vector being formed of the feature vector output from the input layer or an output of the RNN processor included in the lower RNN layer, the recurrent input vector being formed of an output of a previous step of the RNN processor included in the RNN layer, the number of dimensions (I) of the converted vector satisfying a condition indicated in Expression $$I < \frac{(N+M) \cdot M}{N+2M},$$

by the RNN processor of the RNN layer, calculating an RNN output vector from the converted vector calculated in the input converting unit included in the RNN layer, and outputting the RNN output vector, for each step, and by the output layer, calculating the pattern series from the RNN output vector calculated in the RNN processor included in an uppermost layer of the RNN layer, and outputting the pattern series, wherein the input converting unit calculates the converted vector $v_t$ at a step t, from the input vector xt at the step t and the recurrent input vector $m_{t-1}$, with $$v_t = W_{vx} \cdot x_t + W_{vm} \cdot m_{t-1}$$

($W_{vx}$ is a weight matrix for the input vector $x_t$; and $W_{vm}$ is a weight matrix for the recurrent input vector $m_{t-1}$), or $$v_t = k(W_{vx} \cdot x_t + W_{vm} \cdot m_{t-1} + b_v)$$

(k(•) is a nonlinear function applied to each vector; $W_{vx}$ is a weight matrix for the input vector $x_t$, $W_{vm}$ is a weight matrix for the recurrent input vector $m_{t-1}$; $b_v$ is a bias vector having I dimensions where the number of dimensions of the converted vector $v_t$ is I).

* * * * *

UNITED STATES PATENT AND TRADEMARK OFFICE
CERTIFICATE OF CORRECTION

PATENT NO. : 11,636,667 B2
APPLICATION NO. : 15/677069
DATED : April 25, 2023
INVENTOR(S) : Takashi Masuko It is certified that error appears in the above-identified patent and that said Letters Patent is hereby corrected as shown below:

In the Claims

- Claim 2, Column 15, Line 28, "mt" should read as --$m_t$--.

- Claim 5, Column 15, Line 64, "mt" should read as --$m_t$--.

- Claim 8, Column 17, Line 10, "xt" should read as --$x_t$--.

- Claim 9, Column 17, Line 15, "mt" should read as --$m_t$--.

- Claim 9, Column 17, Line 17, "$m_t=\sigma\sigma(W_{mv} \cdot v_t+b_m)$" should read as --$m_t=\sigma(W_{mv} \cdot v_t+b_m)$--.

- Claim 12, Column 17, Line 61, "mt" should read as --$m_t$--.

- Claim 16, Column 20, Line 34, "xt" should read as --$x_t$--.

Signed and Sealed this
Thirty-first Day of October, 2023

Katherine Kelly Vidal
*Director of the United States Patent and Trademark Office*